United States Patent
Lyle

(10) Patent No.: US 9,959,303 B2
(45) Date of Patent: May 1, 2018

(54) ALLEVIATION OF INDEX HOT SPOTS IN DATASHARING ENVIRONMENT WITH REMOTE UPDATE AND PROVISIONAL KEYS

(71) Applicant: International Business Machines Corporation, Armonk, NY (US)

(72) Inventor: Robert W. Lyle, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 14/590,993

(22) Filed: Jan. 7, 2015

(65) Prior Publication Data

US 2016/0196290 A1 Jul. 7, 2016

(51) Int. Cl.
*G06F 17/00* (2006.01)
*G06F 17/30* (2006.01)

(52) U.S. Cl.
CPC .. *G06F 17/30321* (2013.01); *G06F 17/30359* (2013.01); *G06F 17/30371* (2013.01)

(58) Field of Classification Search
CPC ......... G06F 17/30091; G06F 17/30094; G06F 17/30106; G06F 17/3012; G06F 17/30138
See application file for complete search history.

(56) References Cited

U.S. PATENT DOCUMENTS

| | | | |
|---|---|---|---|
| 5,960,194 A | 9/1999 | Choy et al. | |
| 7,290,116 B1 | 10/2007 | Grohoski et al. | |
| 2014/0330921 A1* | 11/2014 | Storm | H04L 67/1097 709/213 |

FOREIGN PATENT DOCUMENTS

WO 2005088481 A1 9/2005

OTHER PUBLICATIONS

List of IBM Patents or Patent Applications Treated as Related.
"Versioning Systems to Support Full and Incremental Data Set Updates"; IPCOM000230623D; Aug. 27, 2013.
Baquero, Carlos et al; "Towards Peer-to-Peer Content Indexing"; ACM SIGOPS Operating Systems Review, vol. 37, Issue 4; Oct. 2003; pp. 90-96.

(Continued)

*Primary Examiner* — Truong Vo

(74) *Attorney, Agent, or Firm* — North Shore Patents, P.C.; Michele Liu Baillie

(57) ABSTRACT

In a remote index operation, a first system in a datasharing group performs an operation on a data object in a database, determines a second system in the datasharing group has exclusive access to an index page to be updated according to the operation, and sends to the second system a remote request to change the index page according to the operation. In response, the second system changes the index page with an index entry referencing the data object and marks a key in the index entry as a provisional key. When a third system in the datasharing group reads the index entry, it determines that the key in the index entry is the provisional key. In response, the third system determines whether the data object exists in the database and a committed state of the transaction, and accordingly determines a current state of the data object.

11 Claims, 4 Drawing Sheets

(56) References Cited

OTHER PUBLICATIONS

Chen, Ching-Wen et al; "A Service Discovery Mechanism with Load Balance Issue in Decentralized Peer-to-Peer Network"; Proceedings of the 2005 11th International Conference on Parallel and Distributed Systems; Jul. 2005.

Lu, Qingda, et al; "Data Layout Transformation for Enhancing Data Locality on NUCA Chip Multiprocessors"; Parallel Architectures and Compilation Techniques, 2009. PACT '09. 18th International Conference; Sep. 2009.

Mohan, C. et al; "Solutions to Hot Spot Problems in a Data Sharing Transaction Environment"; IPCOM000120901D; Jun. 1, 1991.

\* cited by examiner

# ALLEVIATION OF INDEX HOT SPOTS IN DATASHARING ENVIRONMENT WITH REMOTE UPDATE AND PROVISIONAL KEYS

BACKGROUND

In some datasharing architectures, workload is spread across several members or computer systems of a datasharing group. While such spreading of the workload increases the scalability and reliability of the database system, it does so at a performance cost. One instance where performance in datasharing systems is greatly affected occurs when applications utilize keys or indexes with high levels of contention. For example, if an index is created on a timestamp column where the current timestamp is being inserted, the result is that all applications will need to access the last page within an index tree in order to perform the index insertion. As a result, this index page becomes a 'hot spot' and contention increases. In a datasharing environment, the impacts are even greater when multiple datasharing members have such hot spots, because only a single system can be updating the 'hot spot' page at a time. When updating transactions that make changes to the index tree are spread across different members, each member must wait in turn for exclusive access to the page. This typically results in inter-system communication and serialization techniques where an updater has to request exclusive access, and then wait for the exclusive access to the hot spot to be granted. In sustained update environments, this results in hot pages "ping-ponging" back and forth between the members. When a member is able to retain the exclusive access to the page for a small duration to accommodate pending update operations, such as by holding an exclusive lock for the page, this may result in a member that does not currently have exclusive access to wait for access, sometimes for a significant amount of time. If there are many members in the datasharing group, other members could obtain exclusive access to the page first, so the waits can be even longer.

SUMMARY

According to one embodiment of the present invention, in a method for remote index operations in a datasharing system, a first computer system of a plurality of computer systems in a datasharing group performs an operation on a data object in a database. The plurality of computer systems share a storage storing the database, but the plurality of computer systems does not share memory or logs. The first computer system determines that a second system of the plurality of computer systems in the datasharing group currently has exclusive access to an index page to be updated according to the operation. The first computer system sends to the second computer system a remote request to change the index page according to the operation. In response to the remote request, the second computer system changes the index page with an index entry referencing the data object and marks a key in the index entry as a provisional key. In one aspect of the invention, the index entry is marked by setting one or more bits stored with the record identifier within the index.

When a third computer system of the plurality of computer systems in the datasharing group reads the index entry, the third computer system determines that the key in the index entry is the provisional key. In response to determining that the key in the index entry is the provisional key, the third computer system determines whether the data object exists in the database and a committed state of a transaction associated with the index entry. The third computer system then determines a current state of the data object based on whether the data object exists in the database and the committed state of the transaction.

System and computer program products corresponding to the above-summarized methods are also described and claimed herein.

DETAILED DESCRIPTION

Figure 1:
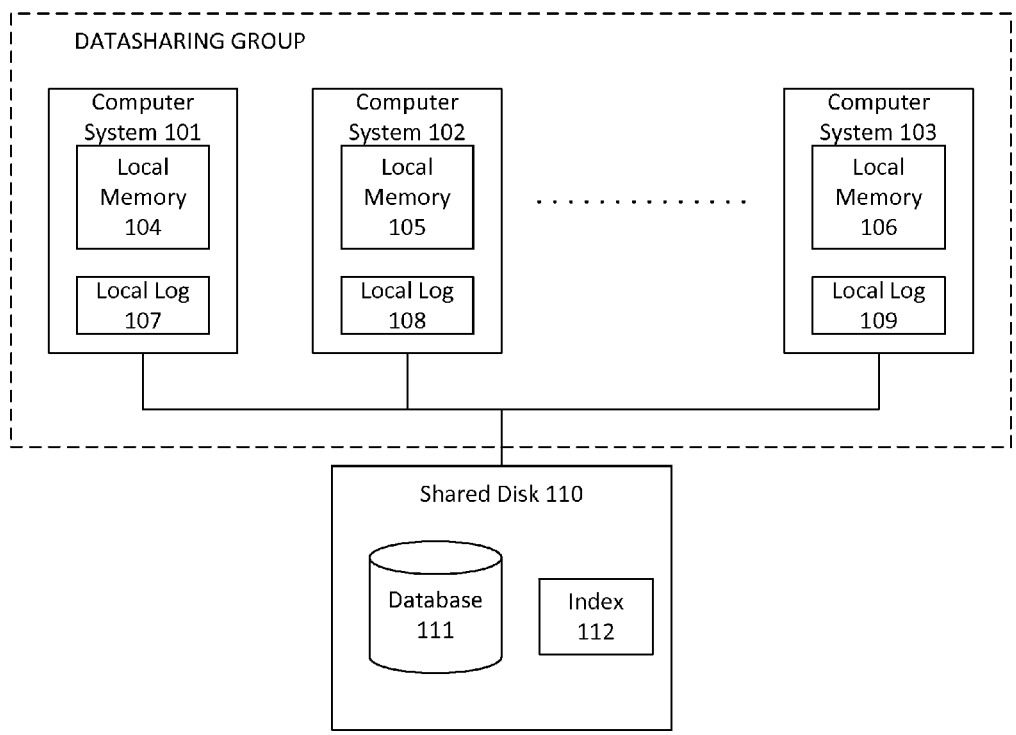
FIG. 1 illustrates a datasharing system according to embodiments of the present invention.

FIG. 1 illustrates a datasharing system according to embodiments of the present invention. The datasharing system 100 comprises a plurality of computer systems 101-103 in a datasharing group. The system 101-130 share a disk 110, which stores a database 111, and may act on data objects stored in the database 111 concurrently. Transactions on the same data object by two or more systems are serialized, such as through the granting of exclusive locks on the relevant page. Each system 101-103 has a local memory 104-106 and a local log 107-109, which are not shared with other systems in the datasharing group. The database 111 may be configured with tables, with each table containing rows and columns of information. To facilitate fast and efficient access to rows in the database 111, an index file 112 may be used. The index 112 may be in a B-tree structure, which includes a root node with many levels of child nodes branching from the root node. The information contained in the nodes may include references to the underlying rows in the database 111. Each reference may include an index key and a row pointer. Data structures other than a B-tree may be used instead for storing the index.

When an operation, such as an insert, delete, or update) is to be performed on a row in the database 111 by a system 101 in the datasharing group, the corresponding index entry referencing this row must also be modified accordingly, and the operation must be properly logged. Embodiments of the present invention allows system 101 of the datasharing group to perform operations on a data object when another system 102 of the datasharing group currently has exclusive access to the index page that contains/will contain the index entry referencing the data object. Instead of waiting to be granted exclusive access to the index page, the system 101 performs the operation and sends a remote request to the system 102 to change the index page according to the operation. This increases throughput of changes to index pages that are hot by providing an alternative to waiting for exclusive access to the index page.

In implementing such a remote operation, concerns for maintaining ACID (Atomicity, Consistency, Isolation, Durability) properties of the database 111 must be addressed. The ACID properties addressed includes: (1) once changed and committed, any changes to the index must be Durable, i.e. it cannot be lost; (2) in support of Atomicity, when a transaction rolls back, the index changes must logically be rolled back as well; and (3) the database system 111 must continue to support consistency and isolation in the presence of the remote operations.

Because the operation for one system of the datasharing group will be performed on a different system of the datasharing group, and the systems do not share a common log, traditional techniques are insufficient. For example, assume the following flow for a remote insertion:

| System 1 (S1) | System 2 (S2) |
|---|---|
| Transaction 1: | |
| Log insertion of row | |
| Insert row into the table | |
| Send request to S2 to insert into index | System agent on behalf of T1: |
| | Log insertion of index entry |
| | Insert index entry |
| | Return success to S1 |

After this sequence, it is possible that T1 either commits the changes to the table or rolls back the changes. If the changes are committed, all of the updates to the table and to the index must be durable, i.e. they must persist, even in the event of system failures. In addition, if T1 performs a roll back, all changes that were made on behalf of T1 must logically be undone. However, the systems in the datasharing group do not share a log, and rolling back a transaction typically requires only accessing the log of the system on which the transaction ran, and the Atomicity and Durability properties would not be preserved for the remote insertion. For example, if T1 is rolled back on system S1, the roll back will undo the changes that were made by T1 on system S1. However, typically individual transactions are not written into logs on multiple systems in the datasharing group. Thus, while the insert into the table would be rolled back correctly, the remote insertion of the index entry referencing the row by the system S2 would not be. Although it may be possible for system S2 to write log records on behalf of T1 into system S1's log, this approach would be overly complex, could impact both availability and performance of the system in recovery scenarios, and introduce more overhead for the remote operations because of the need to thread the log for an agent across multiple systems.

Another approach may be to 'double log' the insertions, i.e., write a log entry both on the remote system S2 and the local system S1. However, this approach increases log volume, decreases performance of the updating transactions, and introduces serialization problems when the requirements of Write Ahead Logging apply. With Write Ahead Logging, T1's local system S1 cannot log an insertion until the insertion is completed, but S1 can't log the insertion until it knows exactly where the insertion occurs. T1 could attempt to locally log the insertion at system S1 after the insertion is already performed by the remote system S2, however this negatively impacts performance and log volume. This could also result in updates on behalf of T1 being lost at system S1, while the remote insertion of the index entry at system S2 is not, leaving orphaned/incorrect index entries in the index. A similar problem occurs if system S2 fails or crashes after T1 commits. If system S2 fails before the log records for the remote insertion are written to disk, it is possible that the update made on behalf of T1 at system S2 could be lost. Having a transaction 'thread' its log across the multiple members could alleviate this problem, but at the expense of decrease performance, increased complexity, and reduced availability.

Embodiment of the present invention addresses these problems by using "provisional keys" in the index. The provisional key and its associated pointer referencing the underlying data object is 'marked' in a way that indicates that the key's existence is 'provisional'. Any reader of this key must consult another data structure to determine the current state of the key. For example, when the data object is a row in a database table, and the key in the index entry referencing the row is marked as provisional, any reader of the index entry must consult the row in the underlying table to determine the current state of the index entry. Other structures may be required to be consulted instead, such as bit maps, lookup trees, hashed structures or any other structures that could be used to contain the current status of the provisional key.

Figure 2:
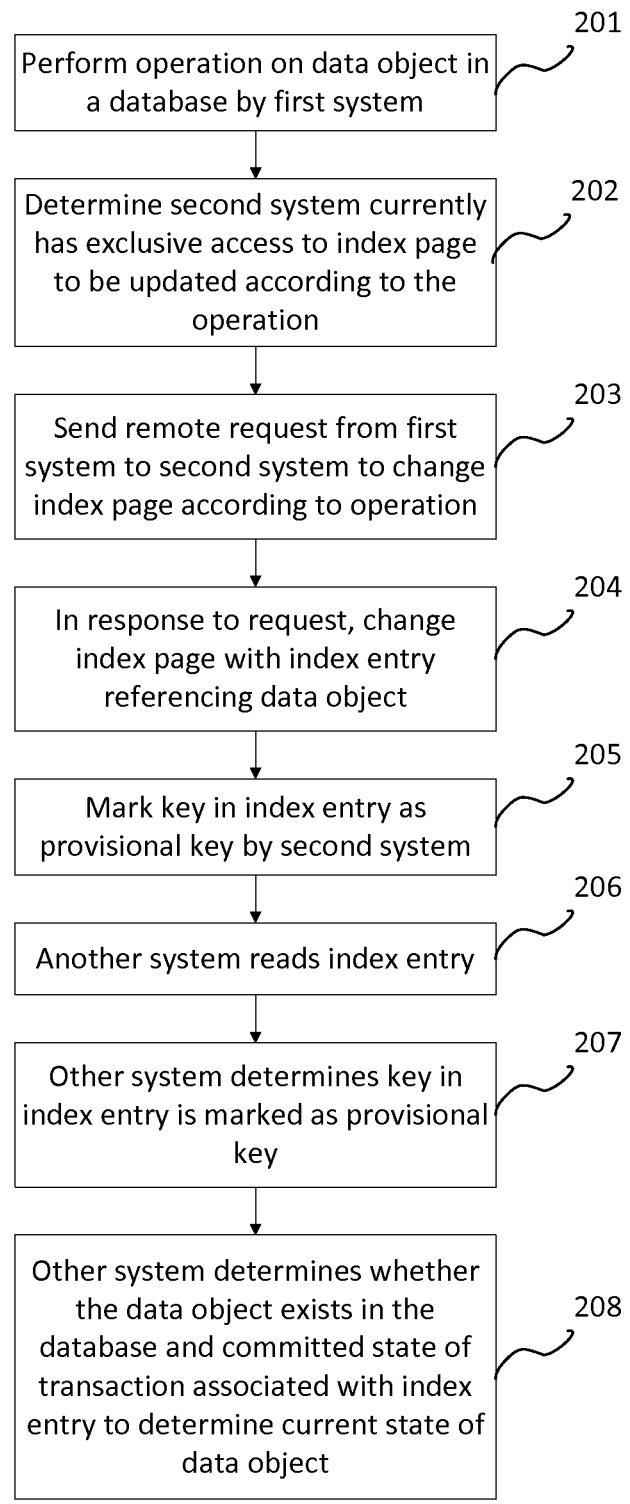
FIG. 2 illustrates a method for remote index operations in a datasharing system according to embodiments of the present invention.

FIG. 2 illustrates a method for remote index operations in a datasharing system according to embodiments of the present invention. A first system 101 of the datasharing group performs an operation on a data object in the database 111 (201). The first system 101 logs the operation in its local log 107. The first system 101 determines that a second system 102 in the datasharing group currently has exclusive access to the index page to be updated according to the operation (202). The first system 101 sends a remote request to the second system 102 to change the index page according to the operation (203). In response, the second system 102 changes the index page with an index entry referencing the data object (204). The second system 102 marks the key in the index entry as a provisional key (205). The second system 102 logs the index page change in its local log 108 as a "redo only" and commits the transaction associated with the index entry. When another system 103 in the datasharing group later reads the index entry in order to access the data object (206), the system 103 determines that the key in the index entry is marked as a provisional key (207). For example, a bit in the index entry may be set to mark the key as provisional. By reading the value of the bit, the system 103 can determine whether or not the key is a provisional key. When the system 103 determines that the key is a provisional key, it performs the additional step of determining whether the data object exists in the database 111 and a committed state of the transaction associated with the index entry (208). This information is then used to determine the current state of the underlying data object.

For example, assume that system 101 inserts a row into a database table (201) and determines that system 102 currently has exclusive access to the index page in which the index entry for this row would be inserted (202). Instead of waiting to obtain exclusive access to the index page before performing the row insert, the system 101 performs the row insert and sends a remote request to system 102 to change the index page to add the index entry for the newly inserted row (203). The system 102 receives the request, and in response, inserts the index entry into the index page (204). The system 102 further marks the key in the index entry as a provisional key (205). When another system 103 reads the index entry (206), the system 103 determines that the key in the index entry is marked as a provisional key (207). The system 103 then accesses the underlying table to determine whether the row exists and the committed state of the transaction to determine the current state of the row (208). If the row exists and the transaction has committed, then the current state of the row is 'permanent'. If the row exists and the transaction has not been committed, then the row is uncommitted. If the row does not exist, then the insert operation has been rolled back or the row was subsequently deleted, and the current state of the row is 'expired'.

Figure 3:
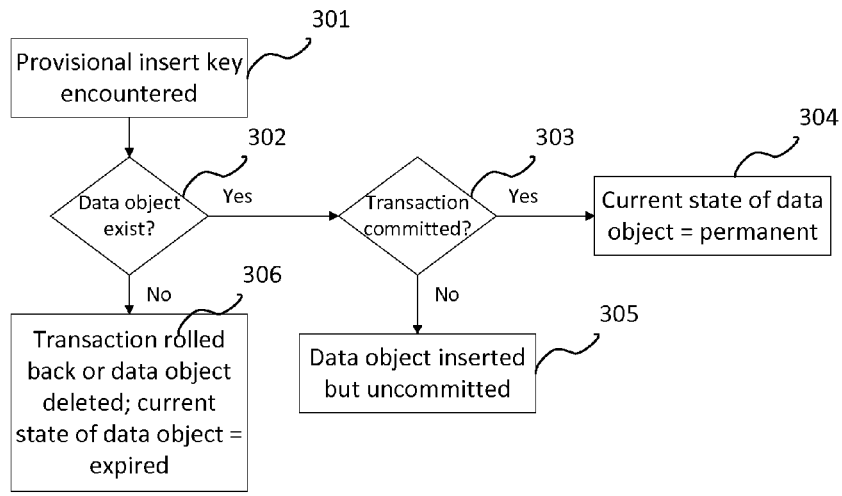
FIGS. 3-4 illustrate in more details the determination of the current state of the provisional key according to embodiments of the present invention.
Figure 4:
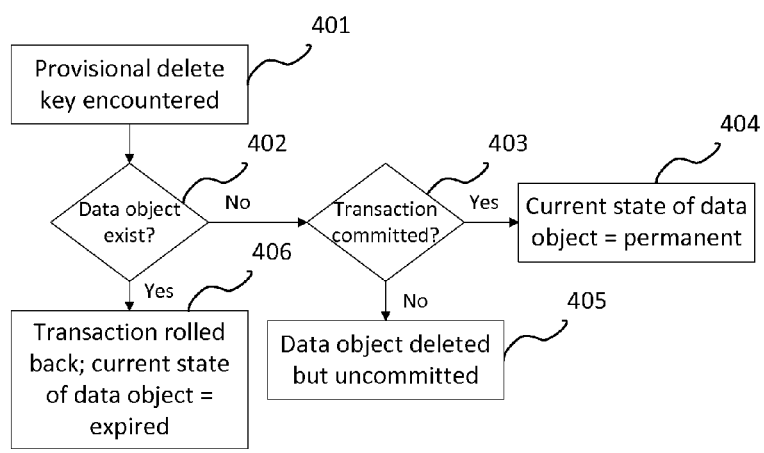
Figure 5:
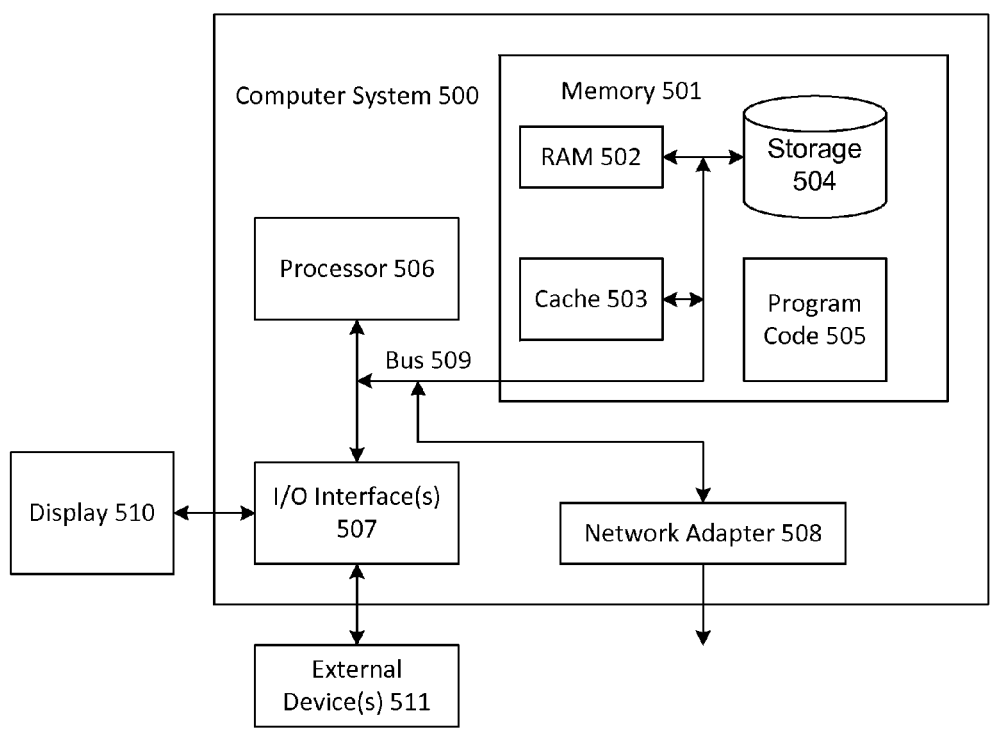
FIG. 5 illustrates a computer system according to embodiments of the present invention.

FIGS. 3-5 illustrate in more details the determination of the current state of the provisional key according to embodiments of the present invention. As illustrated in FIG. 3, when the system 103 encounters a provisional insert key (301), the system 103 accesses the database 111 and determines whether the underlying data object exists (302). When the data object exists, the system 103 determines whether the transaction comprising the operation has committed (303). For example, the system 103 may determine whether the data object is locked, and if so, determine that the transaction has not committed. When the transaction has committed, the current state of the data object is permanent (304). When the transaction has not committed, the data object is inserted but uncommitted (305). When the data object does not exist, the system 103 determines that insert operation has either been rolled back or the data object was subsequently deleted (306), and the current state of the data object is expired.

As illustrated in FIG. 4, when the system 103 encounters a provisional delete key (401), the system 103 accesses the database 111 and determines whether the underlying data object exists (402). When the data object does not exist, the system 103 determines whether the transaction has committed (403). When the transaction has committed, the current state of the data object is permanent (404). When the transaction has not committed, the data object is deleted but uncommitted (405). When the data object does exist, the system 103 determines that the deletion of the data object has been rolled back (406), and the current state of the data object is expired.

In one embodiment, an update operation is a delete operation on a current data object followed by an insert operation of a new data object. Thus, a provisional delete key for the delete portion of the update operation may co-exist in the index with a provisional insert key for the insert portion of the update operation. When the provisional delete key is encountered by the system 103, the system 103 performs the steps set forth in FIG. 3. When the provisional delete key is encountered by the system 103, the system 103 performs the steps set forth in FIG. 4. Alternatively, when the index allows "include columns" that allow additional columns to be appended beyond the unique part of an index key, the key may be marked as a 'provisional update' to indicate that one of the additional key columns were updated in place.

In one embodiment, two bits may be used to mark the key as a provisional key, where one bit indicates whether the operation involved an insertion and the other bit indicates whether the operation involved a deletion. The system 103 examines the values of the bits to identify the operation as an insert, delete, or update. Alternatively, a single bit may be used to mark the key as a provisional key, and the system 103 examines the index entry to identify the operation.

By marking keys as provisional, the ACID properties of the database 111 are maintained. It is the existence or non-existence and the committed state of the underlying data object that determines the current states of the keys. When a transaction is rolled back, the operation on the data object will be undone and the key referencing the data object will be 'logically' removed, without actually removing the key. Even though the key remains in the index after the roll back, the fact that the underlying data object has been removed means the key must be ignored by any system reading the key. To maintain durability, once the provisional key is created, the log record written for the provisional key must be hardened, or written to disk, before the transaction commits. Once this log is written, the provisional key is durable, and the existence of the underlying data object is used to determine the logical existence of the provisional key. Optionally, the log record for the provisional key should be marked as 'redo only' to ensure that it is not undone. If the transaction requesting the provisional key rolls back, the existence of the provisional key will automatically be logically undone by the changes to the underlying data object. Although the reading transactions that encounter provisional keys will incur some overhead in accessing the underlying data objects to determine the current state the provisional keys, this expense provides for much higher throughput of the operations.

Optionally, clean up processes, such as daemons, may be used to remove the provisional marking after the change to the data object commits, or remove the keys after the change is rolled back. Such operations can further be done without logging as they do not logically change the contents of the index. By utilizing such cleanup processes, it is possible to ensure that provisional keys are made non-provisional soon after the changes are committed, thus ensuring that the read overhead is only increased for 'fresh' index updates.

FIG. 5 illustrates a computer system according to embodiments of the present invention. Each system 101-103 in the datasharing group illustrated in FIG. 1 may comprise a computer system 100 as set forth below. The computer system 500 is operationally coupled to a processor or processing units 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or non-volatile storage media 504. The memory 501 may include at least one program product having a set of at least one program code module 105 that are configured to carry out the functions of embodiment of the present invention when executed by the processor 506. The computer system 500 may also communicate with one or more external devices 511, such as a display 510, via I/O interfaces 507. The computer system 500 may communicate with one or more networks via network adapter 508.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for performing a remote index operation in a datasharing system, the computer program product comprising a computer readable storage medium having program instructions embodied therewith, the program instructions executable by a processor to cause the processor to perform a method comprising:
   performing an insert, delete, or update operation of a transaction on a row in a database by a first computer system of a plurality of computer systems in a datasharing group, wherein the plurality of computer systems share a storage storing the database and a shared index corresponding to the database, wherein the plurality of computer systems does not share memory or logs;
   determining, by the first computer system, that a second system of the plurality of computer systems in the datasharing group currently has exclusive access to an index page of the shared index to be updated according to the insert, delete, or update operation;

sending, by the first computer system to the second computer system, a remote request to change the index page according to the insert, delete, or update operation;

in response to the remote request, inserting, by the second computer system, an index entry referencing the row in the database into the index page;

marking, by the second computer system, a key in the index entry as a provisional key;

reading the index entry by a third computer system of the plurality of computer systems in the datasharing group;

determining, by the third computer system, that the key in the index entry is marked as the provisional key;

in response to determining that the key in the index entry is marked as the provisional key, accessing the database, by the third computer system, to determine whether the row exists in the database and a committed state of the transaction; and determining, by the third computer system, a current state of the row based on whether the row exists in the database and the committed state of the transaction.

2. The computer program product of claim 1 wherein the key in the index entry is determined to be a provisional insert key, wherein the determining the current state of the row based on whether the row exists in the database and the committed state of the transaction comprises:

when the row is determined to exist in the database and the transaction has committed, determining, by the third computer system, that the current state of the row is permanent;

when the row is determined to exist in the database and the transaction has not committed, determining, by the third computer system, that the row is inserted but uncommitted; and when the row is determined to not exist in the database, determining, by the third computer system, that the current state of the row is expired.

3. The computer program product of claim 1 wherein the key in the index entry is determined to be a provisional delete key, wherein the determining the current state of the row based on whether the row exists in the database and the committed state of the transaction comprises:

when the row is determined to not exist in the database and the transaction has committed, determining, by the third computer system, that the current state of the row is permanent;

when the row is determined to not exist in the database and the transaction has not committed, determining, by the third computer system, that the row is deleted but uncommitted; and when the row is determined to exist in the database, determining, by the third computer system, that the current state of the row is expired.

4. The computer program product of claim 1, wherein the first computer system writes a log record for the insert, delete, or update operation into a local log of the first computer system, wherein the inserting of the index entry referencing the row by the second computer system comprises writing a log record for the inserting of the index entry into a local log of the second computer system.

5. The computer program product of claim 1, wherein the method further comprises:

after the transaction commits at the first computer system, removing the marking of the key in the index entry as the provisional key; and when the transaction is rolled back at the first computer system, removing the key and the marking in the index entry.

6. The computer program product of claim 1, wherein the marking of the key in the index entry as the provisional key comprises:

setting one or more bits stored with a record identifier in the index entry.

7. A datasharing system, comprising:

a shared storage storing a database and a shared index corresponding to the database;

a datasharing group comprising a plurality of computer systems coupled to the shared storage, wherein the plurality of computer systems does not share memory or logs, wherein a first computer system of the plurality of computer systems:

performs an insert, delete, or update operation of a transaction on a row in the database of a plurality of computer systems in the datasharing group;

determines that a second system of the plurality of computer systems currently has exclusive access to an index page of the shared index to be updated according to the insert, delete, or update operation;

sends to the second computer system a remote request to change the index page according to the insert, delete, or update operation, wherein the second computer system:

in response to the remote request, inserts an index entry referencing the row in the database into the index page; and marks a key in the index entry as a provisional key;

wherein a third computer system of the plurality of computer systems:

reads the index entry;

determines that the key in the index entry is marked as the provisional key;

in response to determining that the key in the index entry is marked as the provisional key, access the database to determine whether the row exists in the database and a committed state of the transaction; and determines a current state of the row based on whether the row exists in the database and the committed state of the transaction.

8. The system of claim 7, wherein the key in the index entry is determined to be a provisional insert key, wherein in determining the current state of the row based on whether the row exists in the database and the committed state of the transaction, the third computer system:

when the row is determined to exist in the database and the transaction has committed, determines that the current state of the row is permanent;

when the row is determined to exist in the database and the transaction has not committed, determining, by the third computer system, that the row is inserted but uncommitted; and when the row is determined to not exist in the database, determines that the current state of the row is expired.

9. The system method of claim 7, wherein the key in the index entry is determined to be a provisional delete key, wherein in determining the current state of the row based on whether the row exists in the database and the committed state of the transaction, the third computer system:

when the row is determined to not exist in the database and the transaction has committed, determines that the current state of the row is permanent;

when the row is determined to not exist in the database and the transaction has not committed, determining, by the third computer system, that the row is deleted but uncommitted; and when the row is determined to exist in the database, determines that the current state of the row is expired.

10. The system of claim 7, wherein the first computer system writes a log record for the insert, delete, or update operation into a local log of the first computer system, and the second computer system writes a log record for the inserting of the index entry into a local log of the second computer system.

11. The system of claim 7, wherein the first computer system further:

after the transaction commits, removing the marking of the key in the index entry as the provisional key; and when the transaction is rolled back, removing the key and the marking in the index entry.

* * * * *